(12) United States Patent  
Henry (10) Patent No.: US 11,002,002 B2
(45) Date of Patent: *May 11, 2021

(54) HOLLOW CONNECTOR SLEEVE WITH INTERLOCKING COMPONENTS

(71) Applicant: Drew P. Henry, Oroville, CA (US)

(72) Inventor: Drew P. Henry, Oroville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/709,585

(22) Filed: Dec. 10, 2019

(65) Prior Publication Data

US 2020/0109551 A1 Apr. 9, 2020

Related U.S. Application Data

(63) Continuation of application No. 14/503,026, filed on Sep. 30, 2014, now Pat. No. 10,501,929.

(Continued)

(51) Int. Cl.
*E04B 2/74* (2006.01)
*E04B 1/26* (2006.01)
*F16B 7/22* (2006.01)

(52) U.S. Cl.
CPC ............ *E04B 1/2604* (2013.01); *E04B 2/744* (2013.01); *E04B 2001/2632* (2013.01);
(Continued)

(58) Field of Classification Search
CPC ............. Y10T 403/7094; Y10T 403/44; Y10T 403/341; Y10T 403/73; Y10T 403/7096; Y10T 403/7073; Y10T 403/42; F16B 9/02; F16B 9/00; F16B 2200/20; F16B 2200/30; F16B 2200/40; F16B 12/02; E04B 1/2403; E04B 1/1903; E04B 2001/2406;
(Continued)

(56) References Cited

U.S. PATENT DOCUMENTS 287,923 A ‡ 11/1883 Gorla ................... E04H 12/2215
256/DIG. 4
1,084,597 A ‡ 1/1914 Anft ..................... A63H 33/082
446/12

(Continued)

FOREIGN PATENT DOCUMENTS

DE 10326196 B3 11/2004
EP 0898086 A2 2/1999
(Continued)

*Primary Examiner* — Kyle J. Walraed-Sullivan
(74) *Attorney, Agent, or Firm* — Kunzler Bean & Adamson (57) ABSTRACT

An apparatus, in one embodiment, includes a hollow connector sleeve having a rectangular opening comprising an interior surface configured to slide over and to conformingly receive a portion of a wooden beam that acts as a support shaft and has a cross-section selected from rectangular and square. The apparatus includes one or more exterior mounting panels and multiple male flanges, where each male flange has a planar rectangular block at a distal end of rectangular connecting shaft that connects to the one or more exterior mounting panels, and where each male flange is configured to be slidably received into an open end of a corresponding female slot. A system and method implement the apparatus and may include an attachment that detachably couples to the hollow connector sleeve.

18 Claims, 10 Drawing Sheets

Related U.S. Application Data (60) Provisional application No. 61/884,806, filed on Sep. 30, 2013.

(52) U.S. Cl.
CPC ............. *F16B 7/22* (2013.01); *F16B 2200/30* (2018.08); *Y10T 29/49826* (2015.01)

(58) Field of Classification Search
CPC ..... E04B 2001/1918; E04B 2001/1921; E04B 2001/1915; E04B 2001/1966; E04B 2/744; E04B 2/7438; E04B 1/1909; E04B 1/1912; E04B 1/1915; E04B 1/1918; E04B 2001/193; E04B 2001/1933; E04B 2002/0234; E04B 2001/2415; E04B 2001/2409; E04B 2001/262; E04B 2001/2628; E04B 2001/2636; E04B 2001/264; A47B 47/03; A63H 33/082
USPC ........ 403/187, 202; 52/651.1, 648.1, 651.01, 52/153, 154
See application file for complete search history.

(56) References Cited

U.S. PATENT DOCUMENTS

| | | | | |
|---|---|---|---|---|
| 1,226,896 A | * | 5/1917 | Lane | B25G 3/02 403/253 |
| 1,563,306 A | ‡ | 11/1925 | Brandt | E04G 5/00 182/132 |
| 2,132,757 A | ‡ | 10/1938 | Paulson | A63H 33/04 446/12 |
| 2,472,363 A | ‡ | 6/1949 | Blackinton | A63H 33/082 446/12 |
| 3,086,627 A | ‡ | 4/1963 | Bernard | E04B 2/744 52/244 |
| 3,342,444 A | ‡ | 9/1967 | Nelson | E04H 12/2215 248/156 |
| 3,608,906 A | ‡ | 9/1971 | Odler | A63F 9/12 273/15 |
| 3,778,175 A | ‡ | 12/1973 | Zimmer | B62D 33/044 403/187 |
| 3,836,218 A | ‡ | 9/1974 | Hallal | F16B 12/02 312/108 |
| 4,021,973 A | ‡ | 5/1977 | Hegg | A47G 5/00 160/351 |
| 4,094,417 A | ‡ | 6/1978 | Cairnes | A47B 47/03 108/192 |
| 4,160,337 A | ‡ | 7/1979 | Fischer | A63H 33/084 446/12 |
| 4,258,522 A | ‡ | 3/1981 | Amaral | E04C 1/40 52/286 |
| D261,401 S | ‡ | 10/1981 | Collis | D20/41 |
| 4,388,786 A | ‡ | 6/1983 | Gassler | E04B 2/744 52/238.1 |
| 4,455,795 A | ‡ | 6/1984 | Cole | E04H 12/2215 52/155 |
| 4,516,756 A | * | 5/1985 | Beatty | E04H 17/06 256/1 |
| 4,543,757 A | ‡ | 10/1985 | Cosgrove | E02D 27/42 248/158 |
| 4,564,732 A | ‡ | 1/1986 | Lancaster | B41J 5/105 200/293 |
| 4,577,449 A | ‡ | 3/1986 | Celli | E04B 1/2403 182/186.8 |
| 4,621,938 A | ‡ | 11/1986 | Weilow | E04B 1/2403 211/182 |
| 4,652,170 A | ‡ | 3/1987 | Lew | E04B 1/617 403/38 |
| 4,671,039 A | ‡ | 6/1987 | Hunt | E04B 2/18 52/562 |
| 4,688,362 A | ‡ | 8/1987 | Pedersen et al. | E04B 2/08 52/223 |
| 4,845,889 A | ‡ | 7/1989 | Taylor | A01G 13/0237 47/32.4 |
| 4,896,999 A | ‡ | 1/1990 | Ruckstuhl | E04C 1/395 405/28 |
| 4,904,108 A | * | 2/1990 | Wendel | E04B 1/1912 403/170 |
| 4,907,388 A | ‡ | 3/1990 | Siahatgar | E04B 2/744 52/481.2 |
| 4,934,858 A | ‡ | 6/1990 | Beaulieu | F16B 12/40 211/192 |
| 4,939,037 A | ‡ | 7/1990 | Freeman | B29D 23/00 138/130 |
| 4,951,440 A | ‡ | 8/1990 | Staeger | E04B 1/1909 403/171 |
| 4,974,987 A | ‡ | 12/1990 | Smock | E04B 2/744 403/252 |
| 5,000,713 A | ‡ | 3/1991 | Cheng | A63H 33/06 273/16 |
| 5,042,615 A | ‡ | 8/1991 | Anderson | E04G 1/20 182/136 |
| 5,048,995 A | ‡ | 9/1991 | Beaulieu | F16B 7/0473 403/174 |
| 5,238,231 A | ‡ | 8/1993 | Huang | B60G 11/62 114/26 |
| 5,267,863 A | ‡ | 12/1993 | Simmons, Jr. | A63F 9/0613 434/96 |
| 5,413,836 A | ‡ | 5/1995 | Hsieh | F16B 37/046 428/122 |
| 5,498,099 A | ‡ | 3/1996 | Scheuer | E06B 3/9624 403/231 |
| 5,499,886 A | ‡ | 3/1996 | Short | A47B 95/043 403/381 |
| 5,568,909 A | * | 10/1996 | Timko | E04H 12/2261 248/519 |
| 5,580,181 A | ‡ | 12/1996 | Nomura | A47B 47/0016 403/170 |
| 5,680,737 A | ‡ | 10/1997 | Sheipline | E04B 1/24 403/169 |
| 5,775,046 A | ‡ | 7/1998 | Fanger | A47B 81/06 108/157.16 |
| 5,791,806 A | ‡ | 8/1998 | Giehl | E04B 2/7809 16/321 |
| 5,799,943 A | ‡ | 9/1998 | Morgan | A63F 3/0423 273/16 |
| 5,802,798 A | ‡ | 9/1998 | Martens | E04B 1/1909 403/171 |
| 5,868,223 A | ‡ | 2/1999 | Lubinski | E04G 7/307 182/179.1 |
| 5,915,803 A | ‡ | 6/1999 | Daugherty | A47B 46/00 312/263 |
| 5,979,119 A | * | 11/1999 | Trafton | E04B 1/2403 52/40 |
| 5,984,587 A | ‡ | 11/1999 | Odle | E04H 12/223 248/530 |
| 6,059,631 A | ‡ | 5/2000 | Maddock | A63H 33/082 446/10 |
| 6,179,511 B1 | ‡ | 1/2001 | Gassler | E04B 2/766 403/170 |
| 6,185,887 B1 | ‡ | 2/2001 | Strassle | A47B 57/045 403/231 |
| 6,237,298 B1 | ‡ | 5/2001 | Castano | E04B 1/3211 403/170 |
| 6,250,025 B1 | ‡ | 6/2001 | Darby | E04H 13/006 52/137 |
| 6,447,360 B1 | ‡ | 9/2002 | Sorensen | A63H 33/062 446/11 |
| 6,886,296 B1 | ‡ | 5/2005 | John | E04H 12/2292 248/519 |
| 6,996,946 B1 | ‡ | 2/2006 | Cazzolaro | E04C 3/005 24/546 |
| 7,185,461 B2 | ‡ | 3/2007 | Lapointe | E02D 27/42 248/533 |
| 7,198,270 B1 | ‡ | 4/2007 | Bishop | A63F 9/12 273/15 |
| D545,380 S | ‡ | 6/2007 | Sorensen | D21/484 |
| D545,381 S | ‡ | 6/2007 | Sorensen | D21/484 |

(56) References Cited

U.S. PATENT DOCUMENTS

| | | | | |
|---|---|---|---|---|
| D545,917 S ‡ | 7/2007 | Sorensen | | D21/484 |
| D545,918 S ‡ | 7/2007 | Sorensen | | D21/484 |
| D545,919 S ‡ | 7/2007 | Sorensen | | D21/484 |
| 7,530,550 B2 ‡ | 5/2009 | Fattori | | E04F 11/1812 |
| | | | | 256/65.05 |
| 7,621,080 B2 ‡ | 11/2009 | Stanfield | | E04H 12/2292 |
| | | | | 52/170 |
| 7,694,485 B1 ‡ | 4/2010 | Siener | | E04B 2/18 |
| | | | | 52/570 |
| 7,779,589 B2 ‡ | 8/2010 | Salman | | E04B 1/4114 |
| | | | | 248/156 |
| 7,833,077 B1 ‡ | 11/2010 | Simmons, Jr. | | A63H 33/08 |
| | | | | 446/12 |
| 7,942,612 B1 ‡ | 5/2011 | Willison | | E02D 5/74 |
| | | | | 256/65.14 |
| 7,980,034 B2 ‡ | 7/2011 | Fehr | | E04C 3/30 |
| | | | | 248/519 |
| 8,082,702 B2 ‡ | 12/2011 | Hill | | E02D 5/80 |
| | | | | 52/155 |
| 8,187,050 B1 ‡ | 5/2012 | Sorensen | | A63H 33/084 |
| | | | | 446/12 |
| 8,282,307 B1 ‡ | 10/2012 | Brown | | A47C 3/00 |
| | | | | 297/440.1 |
| 8,523,134 B2 ‡ | 9/2013 | Walker | | E04H 12/2215 |
| | | | | 248/156 |
| 8,671,640 B1 ‡ | 3/2014 | Thomas | | E04B 2/18 |
| | | | | 446/122 |
| 9,200,443 B2 ‡ | 12/2015 | Marple | | E04B 2/60 |
| 2001/0025460 A1 ‡ | 10/2001 | Auer | | E04B 2/744 |
| | | | | 52/282.2 |
| 2002/0054787 A1 ‡ | 5/2002 | Kahl | | F16B 7/187 |
| | | | | 403/403 |
| 2002/0122691 A1 ‡ | 9/2002 | Wood | | F16B 5/0685 |
| | | | | 403/381 |
| 2003/0036314 A1 ‡ | 2/2003 | Schmalzhofer | | F16B 7/187 |
| | | | | 439/680 |
| 2003/0044228 A1 ‡ | 3/2003 | Nicoletti | | A47B 57/565 |
| | | | | 403/170 |
| 2004/0033103 A1 ‡ | 2/2004 | Ludwig | | E04B 9/14 |
| | | | | 403/188 |
| 2004/0102132 A1 ‡ | 5/2004 | Miller | | A63H 33/082 |
| | | | | 446/125 |
| 2004/0121699 A1 ‡ | 6/2004 | Ladner | | A63H 33/082 |
| | | | | 446/85 |
| 2004/0168382 A1 ‡ | 9/2004 | Rudduck | | A47B 91/02 |
| | | | | 52/238.1 |
| 2005/0005556 A1 ‡ | 1/2005 | Collier | | E04B 2/18 |
| | | | | 52/578 |
| 2005/0025581 A1 * | 2/2005 | Rogers | | E04G 7/307 |
| | | | | 405/272 |
| 2005/0055954 A1 * | 3/2005 | Simmons | | B23K 31/12 |
| | | | | 52/633 |
| 2006/0081829 A1 * | 4/2006 | Platt | | E04H 17/1421 |
| | | | | 256/65.01 |
| 2006/0104715 A1 ‡ | 5/2006 | Newton | | E04H 12/2269 |
| | | | | 404/9 |
| 2006/0165482 A1 ‡ | 7/2006 | Olberding | | E04B 1/24 |
| | | | | 403/381 |
| 2006/0278772 A1 ‡ | 12/2006 | Walker | | E04H 12/2215 |
| | | | | 248/156 |
| 2007/0006542 A1 ‡ | 1/2007 | Duke | | E04B 2/06 |
| | | | | 52/561 |
| 2007/0209314 A1 ‡ | 9/2007 | Vaughn | | E02D 27/34 |
| | | | | 52/838 |
| 2008/0179581 A1 * | 7/2008 | Mulgrew | | E04H 17/1439 |
| | | | | 256/65.03 |
| 2008/0224470 A1 ‡ | 9/2008 | Erez | | A47B 47/0016 |
| | | | | 285/330 |
| 2008/0280521 A1 ‡ | 11/2008 | Bishop | | A63H 33/082 |
| | | | | 446/124 |
| 2008/0280523 A1 ‡ | 11/2008 | Bishop | | A63H 33/082 |
| | | | | 446/124 |
| 2010/0005752 A1 ‡ | 1/2010 | Hawkins | | E04B 1/1903 |
| | | | | 52/655.1 |
| 2010/0059094 A1 ‡ | 3/2010 | Ma | | A45B 25/02 |
| | | | | 135/28 |
| 2011/0101607 A1 ‡ | 5/2011 | Howard et al. | | A63F 9/04 |
| | | | | 273/14 |
| 2011/0180350 A1 ‡ | 7/2011 | Thacker | | E04G 7/307 |
| | | | | 182/186.8 |
| 2012/0299352 A1 ‡ | 11/2012 | Line | | B60N 2/0732 |
| | | | | 297/344.1 |
| 2014/0010587 A1 ‡ | 1/2014 | Strassle | | F16B 7/0446 |
| | | | | 403/187 |
| 2014/0182234 A1 * | 7/2014 | Yang | | E04B 1/24 |
| | | | | 52/655.1 |
| 2014/0260083 A1 ‡ | 9/2014 | Zhang | | F16B 37/0885 |
| | | | | 52/843 |
| 2017/0130444 A1 * | 5/2017 | Higgins | | E04B 1/2608 |
| 2017/0314254 A1 * | 11/2017 | Houghton | | E04B 1/1912 |

FOREIGN PATENT DOCUMENTS

| | | |
|---|---|---|
| FR | 2574876 A1 | 6/1986 |
| FR | 2663404 A1 | 12/1991 |
| GB | 1350621 | 4/1974 |
| WO | 01/03791 A1 | 1/2001 |
| WO | 2009/000003 A1 | 12/2008 |

\* cited by examiner
‡ imported from a related application

HOLLOW CONNECTOR SLEEVE WITH INTERLOCKING COMPONENTS

CROSS-REFERENCES TO RELATED APPLICATIONS

This application is a continuation application of and claim priority to U.S. patent application Ser. No. 14/503,026 entitled "Hollow Connector Sleeve With Interlocking Components" and filed on Sep. 30, 2014, for Drew P. Henry, which claims the benefit of U.S. Provisional Patent Application No. 61/884,806 filed on Sep. 30, 2013, for Drew P. Henry, all of which are incorporated herein by reference.

FIELD

This disclosure relates generally to coupling elements together, and more particularly to detachably coupling attachments to support shafts.

BACKGROUND

Structures are often constructed using various elements that are fastened and/or coupled together in a desired configuration. Certain structures, such as temporary structures, are configured to be repeatedly assembled and disassembled. For example, trade fair booths, temporary fencing lines, tents, scaffolding, and fair equipment, among others, are types of temporary structures that are assembled using various conventional tools and techniques. Other structures, such as permanent structures, are constructed using various conventional techniques.

SUMMARY

The subject matter of the present application has been developed in response to the present state of the art, and in particular, in response to the problems associated with conventional coupling elements. Accordingly, the subject matter of the present application has been developed to provide an apparatus, system, and method for coupling attachments to support shafts that overcome at least some of the above-discussed shortcomings of prior art techniques.

Disclosed herein is one embodiment of a connection apparatus that includes a hollow connector sleeve. The hollow connector sleeve has an interior surface that can circumscribe a portion of at least one support shaft and at least one exterior mounting panel. The connection apparatus further includes at least one of either a male or a female interlockable component disposed on the at least one exterior mounting panel, with at least one of the other of the male or the female interlockable component disposed on an attachment. According to one implementation, the attachment may be a second hollow connector sleeve. In one implementation, the hollow connector sleeve has a rectangular cross-section and the interior surface includes four interior walls. In another implementation, the hollow connector sleeve has a circular cross-section and the interior surface is cylindrical. The hollow connector sleeve may be formed from two semi-sleeves that can be affixed together around the at least one support shaft and the hollow connector sleeve may include at least one anchoring mechanism for anchoring the hollow connector sleeve to the at least one support shaft.

In one implementation, one primary male interlockable component and two secondary male interlockable components are disposed on the at least one exterior mounting panel. In such an implementation, the male interlockable component is a protruding flange and the female interlockable component is a corresponding slot for receiving the protruding flange. According to one implementation, the apparatus further includes one or more attachments detachably couplable to the hollow connector sleeve. For example, the one or more attachments can be selected from the group that includes: a hook, a magnetic coupling, a bolt assembly, a hinge, a rotating bearing, a pivoting bearing, a sliding bearing, an electrical conduit support, an electrical box, an electrical fixture, Velcro member, a clamp, and a strap.

Also disclosed herein is one embodiment of a connection system that includes at least one support shaft, a hollow connector sleeve, and an attachment. The hollow connector sleeve includes an interior surface circumscribing a portion of the at least one support shaft and at least one exterior mounting panel that has at least one interlockable component. The attachment may include at least one corresponding interlockable component that is detachably couplable to the at least one interlockable component.

According to one implementation, the at least one interlockable component includes one of at least one male flange and at least one female slot and the at least one corresponding interlockable component includes the other of the at least one male flange and the at least one female slot. In one implementation, the at least one interlockable component is three separate interlockable components on an exterior mounting panel of the at least one exterior mounting panel. In such an implementation, the three separate interlockable components may include a central primary interlockable component and two secondary interlockable components. The at least one corresponding interlockable component of the attachment may be a single corresponding interlockable component that is detachably couplable to the central primary interlockable component. In yet another implementation, the at least one corresponding interlockable component of the attachment is a single corresponding interlockable component that is detachably couplable to all three of the interlockable components. The at least one corresponding interlockable component of the attachment may include three separate corresponding interlockable components that are detachably couplable to the three interlockable components.

Further disclosed herein is one embodiment of a method for coupling a support shaft to an attachment. The method includes positioning a hollow connector sleeve around a support shaft, with the hollow connector sleeve having at least one anchoring mechanism and at least one exterior mounting panel that has at least one interlockable component. The method further includes securing the hollow connector sleeve around the support shaft using the anchoring mechanism and coupling the attachment to the hollow connector sleeve, the attachment having at least one corresponding interlockable component that is detachably couplable with the at least one interlockable component. According to one implementation, the at least one interlockable component has one of at least one male flange and at least one female slot and the at least one corresponding interlockable component comprises the other of the at least one male flange and the at least one female slot. In another implementation, coupling the attachment to the hollow connector sleeve includes sliding the at least one male flange into the at least one female slot. In one implementation, the support shaft is a first support shaft and the hollow connector sleeve is a first hollow connector sleeve, wherein the attachment is a second hollow connector sleeve positioned around a second support shaft. In yet another implementation, the support shaft is a first support shaft and positioning the hollow connector sleeve around the first support shaft further includes positioning the hollow connector sleeve around a second support shaft.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not, therefore, to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1A:
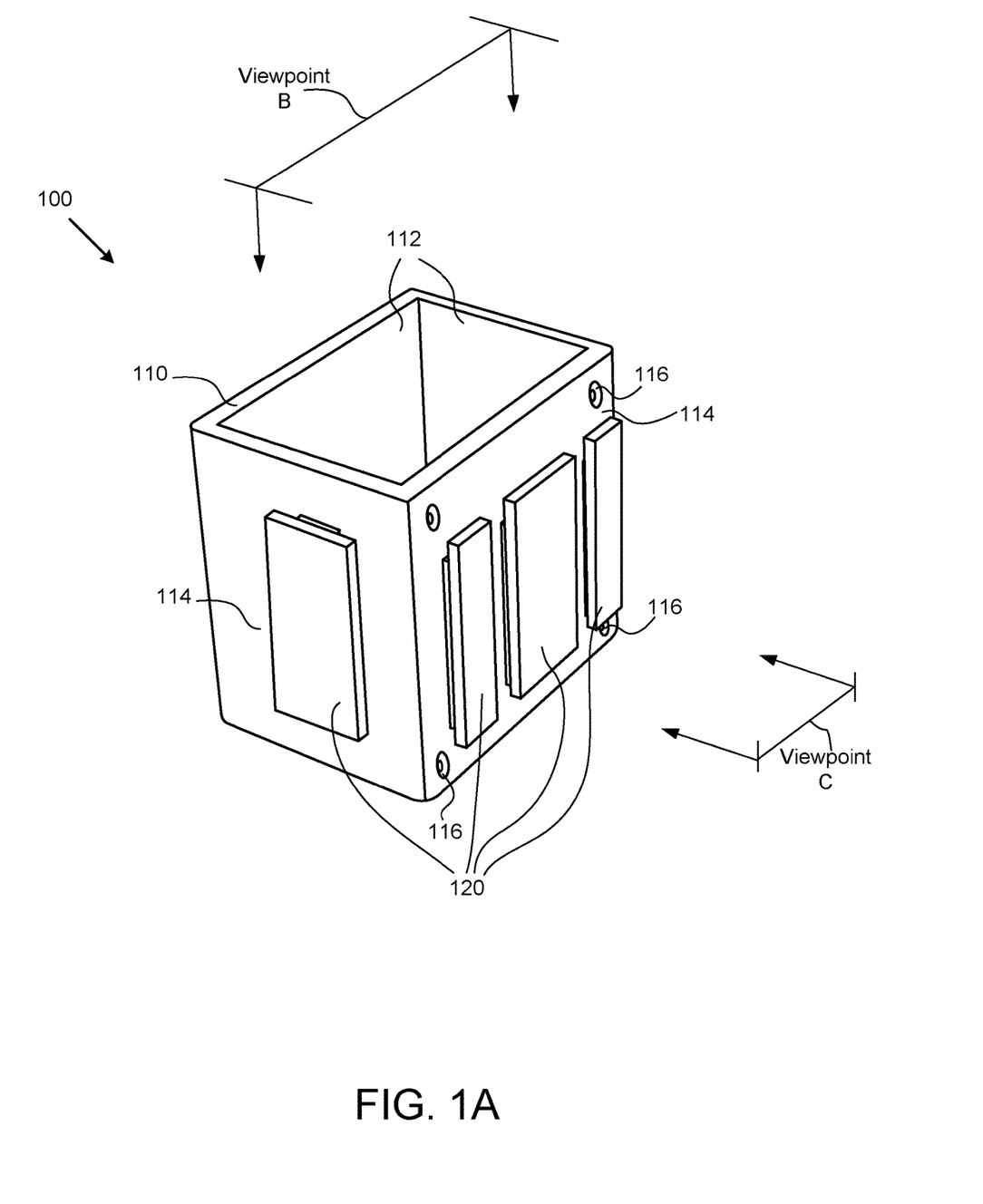
FIG. 1A is a perspective view of a connection apparatus, according to one embodiment.

FIG. 1A is a perspective view of a connection apparatus 100, according to one embodiment. The connection apparatus 100 includes a hollow connector sleeve 110 and at least one interlockable component 120. Generally, the purpose of the connection apparatus 100 of the present disclosure is to enable a user to quickly and efficiently connect various components together in a secure yet detachable configuration. In one embodiment, the hollow connector sleeve 110 circumscribes a portion of a support shaft (described below) and includes interlockable components 120 that can engage complementary interlockable components on an attachment, thus allowing the support shaft and the attachment to securely (yet detachably) connect to each other.

For example, wooden beams may be securely held together using various embodiments of the connection apparatus 100. In one embodiment, a wooden beam with a rectangular cross-section (e.g., a "2×4") may be inserted into a hollow connector sleeve 110 and a subsequent wooden beam with a square cross-section (e.g., a "4×4") may also be inserted into a second connector sleeve. Using the complementary interlockable components on the two connector sleeves, the wooden beams can be easily connected to one another. The two wooden beams may be repeatedly attached and detached in applications where the structure is temporary. For example, trade fair booths, temporary fencing lines, tents, scaffolding, and fair equipment, among others, are potential applications for the secure yet detachable design of the connection apparatus 100. While the connection apparatus 100 provides the flexibility to easily construct and deconstruct a structure, it is also contemplated that the connection apparatus 100 of the present disclosure may also be used in permanent applications, such as home construction projects. For additional examples of how the connection apparatus 100 of the present disclosure can be implemented, see the description below with reference to FIG. 5.

Details regarding the hollow connector sleeve 110, the interlockable components 120, the attachments, and the various other elements of the connection apparatus 100 and system are included below with reference to FIGS. 2A-5. Also, FIG. 1A shows the interior surfaces 112 of the hollow connector sleeve 110 and the exterior mounting panels 114 of the hollow connector sleeve 110. Additionally, FIG. 1A shows multiple anchoring mechanisms 116 that are described in greater detail below. Also, FIG. 1A shows two viewpoints: "Viewpoint B" is the view from which FIG. 1B is depicted and "Viewpoint C" is the view from which FIG. 1C is depicted.

Figure 1B:
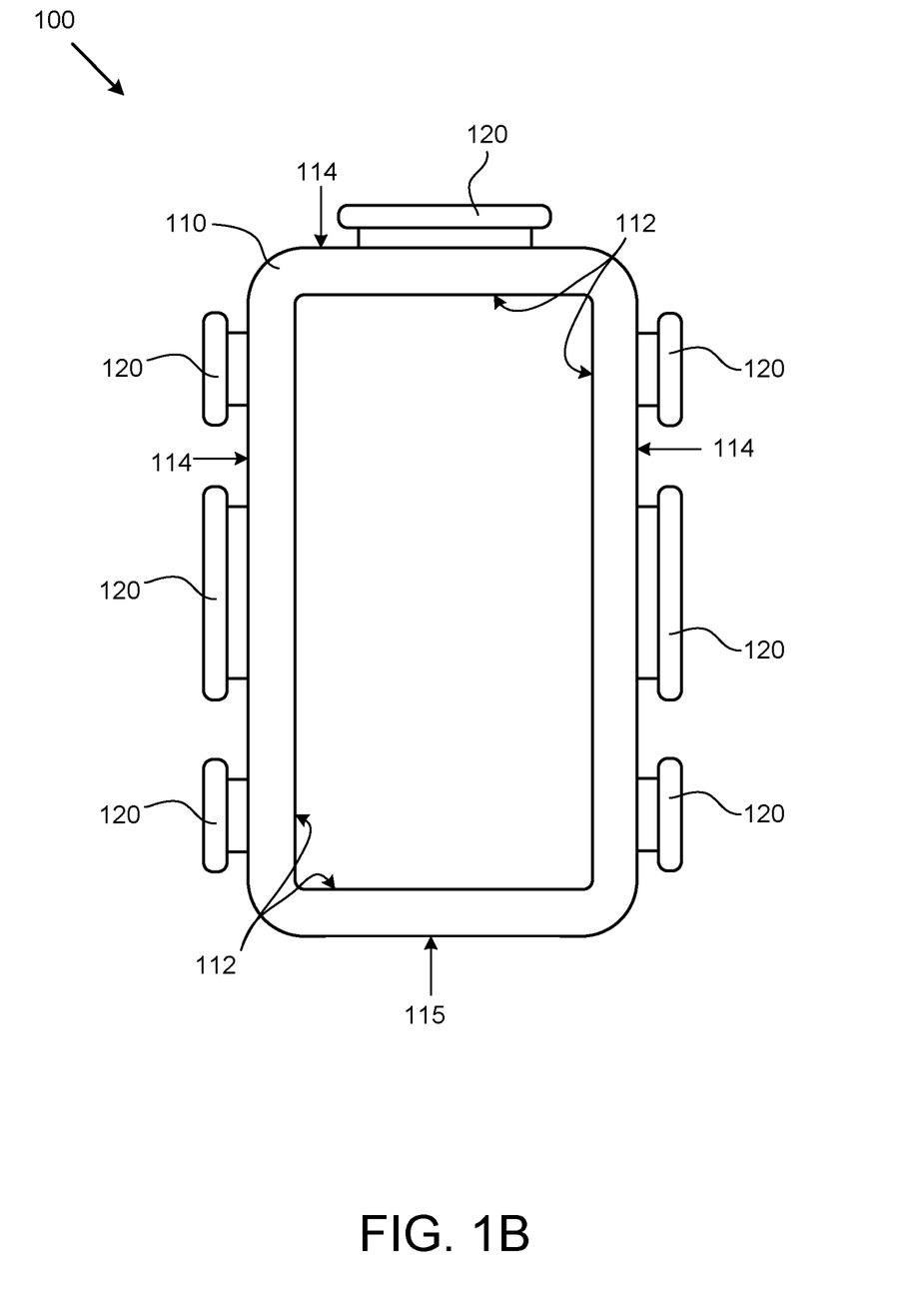
FIG. 1B is a top view of the connection apparatus depicted in FIG. 1A, according to one embodiment.
Figure 1C:
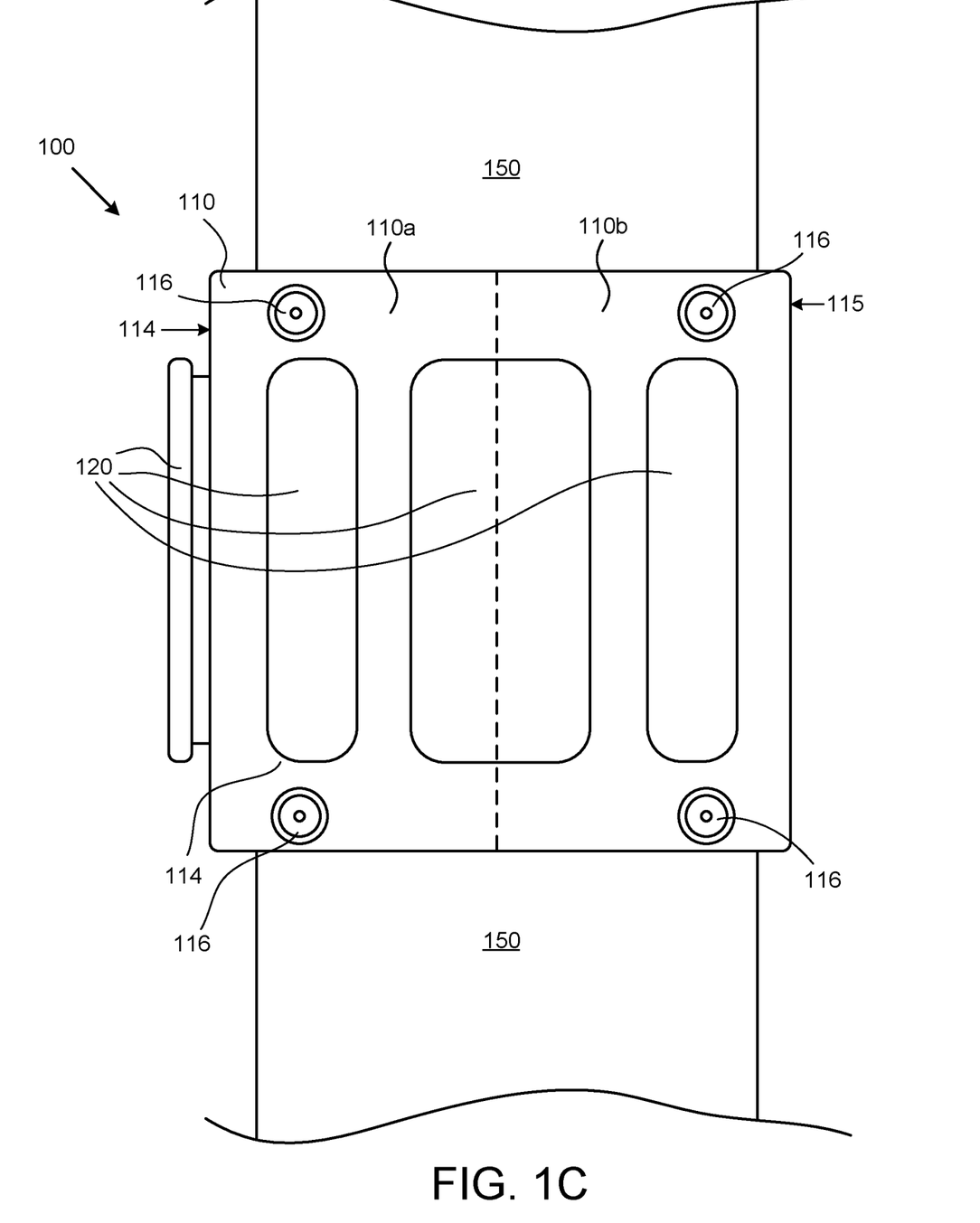
FIG. 1C is a side view of the connection apparatus depicted in FIG. 1A, but with a support shaft extending through the connection apparatus, according to one embodiment.

FIG. 1B is a top view (from "Viewpoint B" in FIG. 1A) of the connection apparatus 100 depicted in FIG. 1A, according to one embodiment. The connection apparatus 100 may be constructed from any durable material that is capable of withstanding the forces/loads of the anticipated application. In one embodiment, the connection apparatus 100 is constructed of a glass-filled nylon material. In another embodiment, the connection apparatus 100 is constructed of polymer composites, plastic, wood, or metal. Also, the connection apparatus 100 may be one integral element or it may be constructed from various elements. For example, in one embodiment (not depicted) the hollow connector sleeve 110 includes halves that can be connected together about an existing support shaft. In such embodiments, the connection apparatus 100 can be used to modify or retrofit existing (e.g., permanent) structures. With regards to retrofitting, it is also contemplated that the interlockable components 120 may also be modular in that the interlockable components 120 themselves may also be removable/replaceable. In other words, default interlockable components 120 can be disconnected from the hollow connector sleeve 110 and replaced with alternate interlockable components 120 in order to satisfy the specifics of a given application. When the connection apparatus 100 is made from a polymeric material, the apparatus 100 may be fabricated using conventional injection molding or extruding processes. In other embodiments, the connection apparatus 100 may be welded or soldered together.

As depicted in FIG. 1B, the cross-sectional shape of the hollow connector sleeve 110 may be rectangular in order to fit over/circumscribe rectangular shafts. In other embodiments, depending on the specifics of a given application, the hollow connector sleeve 110 may have a circular, square, hexagonal, or another cross-sectional shape. Additional details regarding an embodiment with a cylindrical (circular cross-section) are included below with reference to FIG. 4. The interior surface(s) 112 of the hollow connector sleeve 110 may include components for preventing the support shaft (beam or element about which the apparatus 100 is connected) from slipping. For example, in certain embodiments, the interior surface 112 may include grooves or compression channels that prevent the support shaft from slipping through the hollow connector sleeve 110. In other embodiments, the interior surfaces 112 of the hollow connector sleeve 110 may be coated with a non-slip material to further promote a good fit between the support shaft and the connection apparatus 100. These non-slip, interior surface features may be implemented independent of the anchoring mechanism 116 (described below in greater detail with reference to FIG. 1C) or may be used in conjunction with the anchoring mechanism to further provide stability between the support shaft and the connection apparatus 100.

The interlockable components 120, as described below in greater detail, are disposed on the exterior mounting panels 114. The interlockable components 120 may be integrated with the hollow connector sleeve 110 or may be affixed (i.e., welded or otherwise permanently bonded/attached) to the exterior mounting panels 114. Throughout the present disclosure, the term "exterior mounting panels" 114 refers to the exterior surfaces of the hollow connector sleeve 110 that have interlockable components protruding therefrom. The exterior surfaces, or at least the portions of the exterior surface, that do not have a protruding interlockable component, are labeled as the "non-attaching panels" 115 throughout the present disclosure. For example, the embodiment of the connection apparatus 100 depicted in FIG. 1B includes three exterior mounting panels 114 and one non-attaching panel 115. The designation of one side as a non-attaching panel 115 does not preclude that side from being affixed or attached to another component; the designation only means that interlockable components 120 are not included on that side of the hollow connector sleeve 110. Additional details regarding the interlockable components 120 are included below with reference to FIG. 2B.

FIG. 1C is a side view (from viewpoint "C" in FIG. 1A) of the connection apparatus 100 depicted in FIG. 1A, but with a support shaft 150 extending through the connection apparatus 100, according to one embodiment. As mentioned above, the support shaft 150 is the element, pole, rod, or beam that extends through the hollow connector sleeve 110. In some embodiments, the support shaft 150 may not completely extend through the hollow connector sleeve 110 but instead may abut up to another support shaft 150. In other words, the hollow connector sleeve 110 may also function as a coupling component for connecting two support shafts 150 together. Also, in one embodiment, the connection apparatus 100 may be an end cap that fits over the end of a support shaft 150 and thus the hollow connector sleeve 110 may have 5 sides (instead of the four side walls depicted in the Figures).

Also depicted in FIG. 1C are the anchoring mechanisms 116. The hollow connector sleeve 110 may be formed from two semi-sleeves 110a, 11b that can be affixed together around the at least one support shaft 150 and the hollow connector sleeve may include at least one anchoring mechanism for anchoring the hollow connector sleeve 110 to the at least one support shaft 150. As briefly described above, the anchoring mechanisms 116 may be implemented independently of or in conjunction with the interior surface features or materials in order to prevent the support shaft from slipping with respect to the connection apparatus 100. The anchoring mechanism 116, in one embodiment, includes multiple holes in the hollow connector sleeve 110 through which nails or screws may be driven to secure the shafts 150 at a selected position with respect to the hollow connector sleeve 110. In other embodiments (not depicted), the anchoring mechanism may include straps, clamps, fasteners, bolt assemblies, etc., for securing the hollow connector sleeve 110 about the support shaft 150.

Figure 2A:
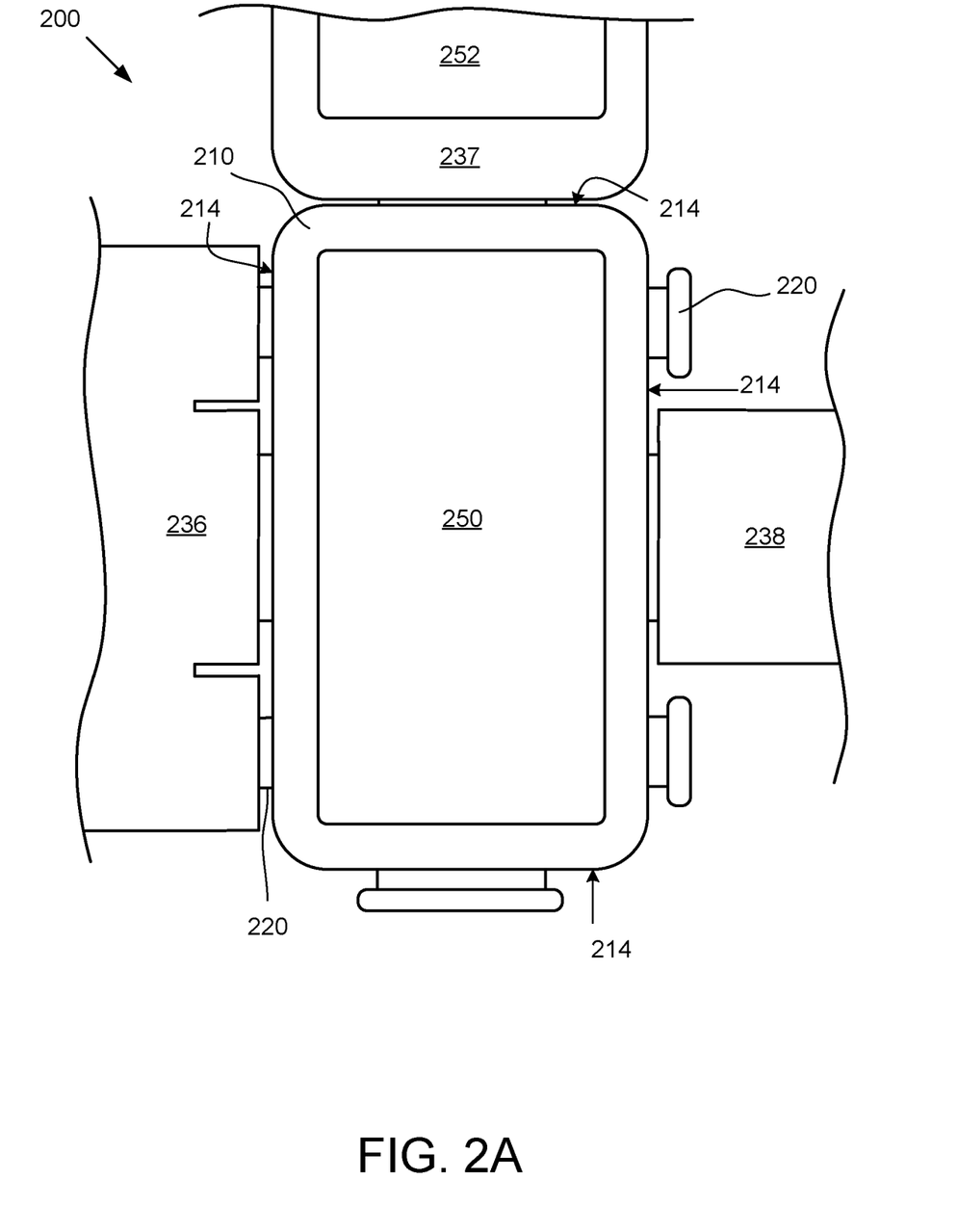
FIG. 2A is a top view of a connection apparatus with various attachments, according to one embodiment.
Figure 2B:
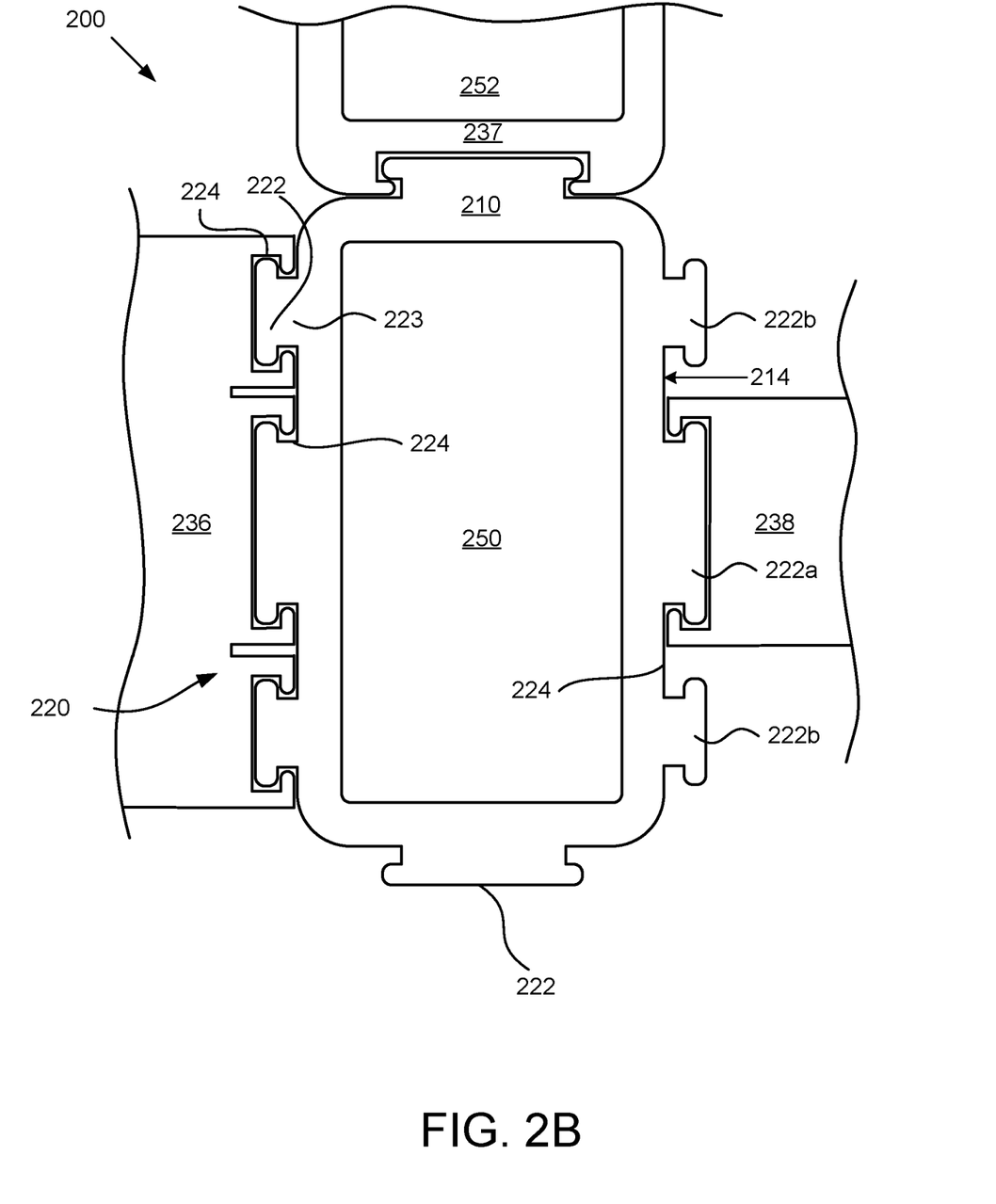
FIG. 2B is a cross-sectional view of the connection apparatus depicted in FIG. 2A, according to one embodiment.

FIG. 2A is a top view of a connection apparatus 200 and FIG. 2B is a cross-sectional view of a connection apparatus 200 with various attachments 236, 237, 238 and a support shaft 250, according to one embodiment. The attachments 236, 237, 238 include complementary interlockable components (e.g., female slots 224, male flanges 222) that engage the interlockable component(s) 220 (e.g., male flanges 222, female slots 224) affixed to the exterior mounting panels 214 of the hollow connector sleeve 210. In one embodiment, one of the attachments may include a second connection apparatus 237 that circumscribes a second support shaft 252. In one embodiment (as depicted), the hollow connection sleeve 210 may have an exterior mounting panel 214 that has three separate interlockable components 220 (e.g., male flanges 222). Depending on the specific application, an attachment 236 may span across multiple interlockable components due to the force/load that is anticipated on such a component while other attachments 238 may only engage a single interlockable component 220 (e.g., 222b) thereby leaving space for additional attachments to be connected. In other words, an exterior mounting panel 214 of the hollow connector sleeve 210 may include, for example, three interlockable components 220: a primary central protruding male flange 222a and two secondary protruding male flanges 222b. In one embodiment, the central protruding male flange 222a may be comparatively larger (wider, longer, etc) than the secondary protruding male flanges 222b (as depicted). Certain attachments may have a single female associated interlockable component (e.g., female slot 224) that receives/interlocks with the primary protruding male flange (e.g., 222a). Other attachments may have a single female associated interlockable component 220 (e.g., female slot 224) that receives/interlocks with one of the two secondary protruding male flanges (e.g., 222b). Other attachments may have a single female slot 224 that receives all three protruding male flanges 222 or three separate female slots 224 that each receives one of the three protruding male flanges 222.

The attachments may include features or elements that are useful for a specific application or purpose. For example, an attachment may include another hollow connection sleeve, a hook, a magnetic coupling, a bolt assembly, a hinge, a rotating bearing, a pivoting bearing, a sliding bearing, an electrical conduit support, an electrical box, an electrical fixture, Velcro member, a clamp, a strap, etc. These features may not require a separate/independent attachment but instead may be auxiliary features mounted on an existing attachment or on the connection apparatus 200 itself. For example, a hook or a hinge assembly may not be connected to the hollow connector sleeve 210 via the interlockable components but instead, the hook or hinge assembly may be attached to the hollow connector sleeve 200 or to an attachment via some other mechanism (welding, bonding, permanently affixed). The feature may be integrated with the connection apparatus 200 or may be affixed via bonding, welding, bolts, clamps, screws, etc. Thus, the features listed above, as well as any additional features/elements, may be implemented in conjunction with the connection apparatus 200 as attachments coupled via the interlockable components 220, or as auxiliary features, mounted/affixed to the connection apparatus 200 without using the interlockable components 220.

FIG. 2B is a cross-sectional view of the connection apparatus 200 depicted in FIG. 2A, according to one embodiment. The interlockable components may be configured in various forms. The embodiment shown throughout the figures, depicting a protruding male flange 222 at the end of a shaft 223 distal from an exterior mounting panel 214 and a complementary recessed female slot 224 of the attachment 236, is only illustrative of one example of the interlockable components 220. It is contemplated that other configurations, such as interlocking teeth, interlocking dovetails, interlocking hooks, and other complementary sets of protrusions and recessions, fall within the scope of the present disclosure. Additionally, the number, size, dimensions, and angled configuration of the interlockable components 220 depicted in the figures are not intended to limit the scope of the present disclosure. Thus, the exterior mounting panel 214 may include a single interlockable component 220 or may include multiple interlockable components 220 to provide flexibility in arranging the attachments 236, 237, 238. Also, the male flanges 222 may be affixed to the attachments and the recessed female slots 224 may be affixed to the connection apparatus 200 (vice-versa as depicted). Also, as described above, the interlockable components 220 themselves may be removable so that a user can switch out the configuration of interlockable components 220 depending on the specifics of a given application.

Figure 3A:
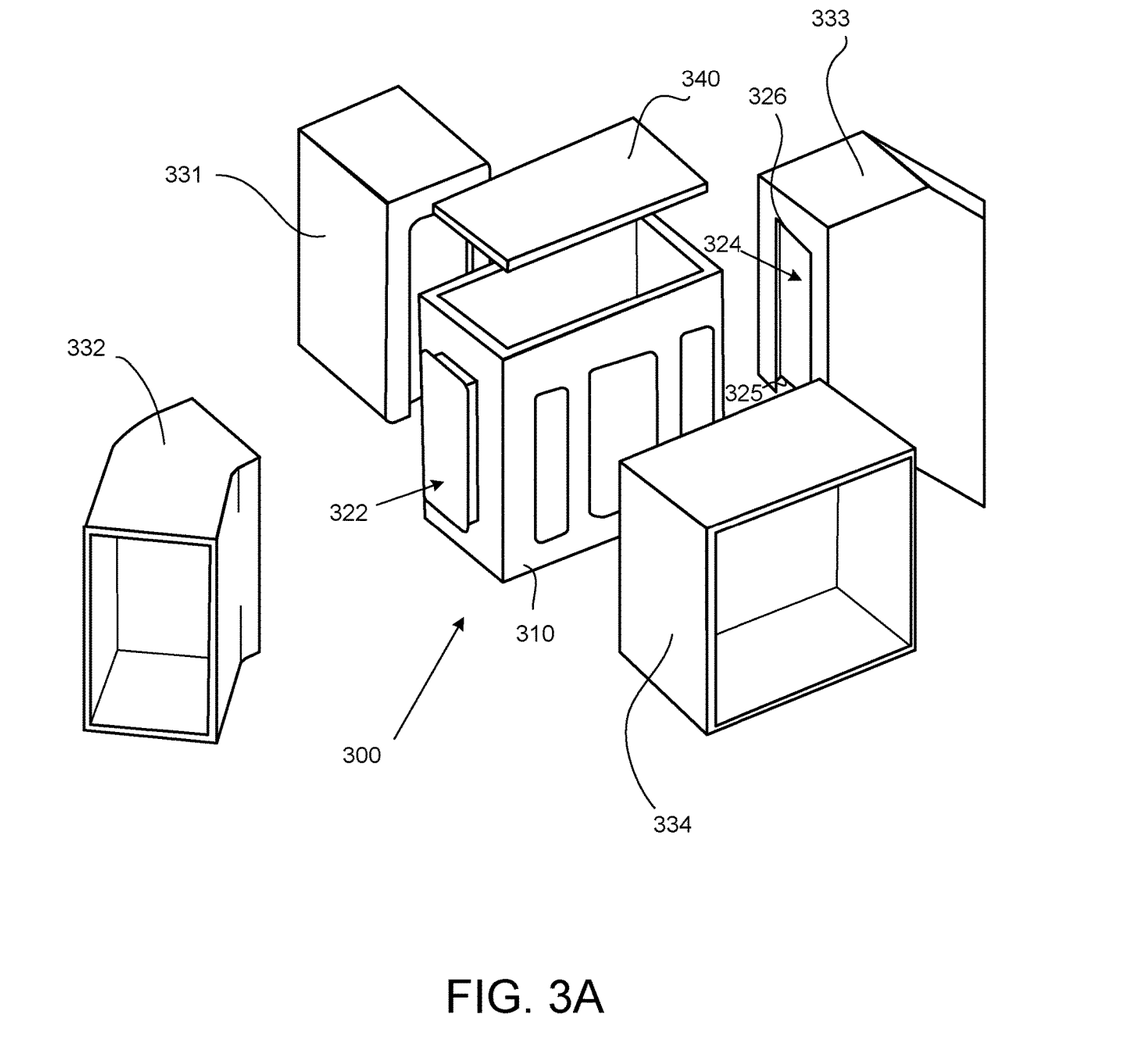
FIG. 3A is a perspective view of a connection apparatus with various attachments, according to one embodiment.
Figure 3B:
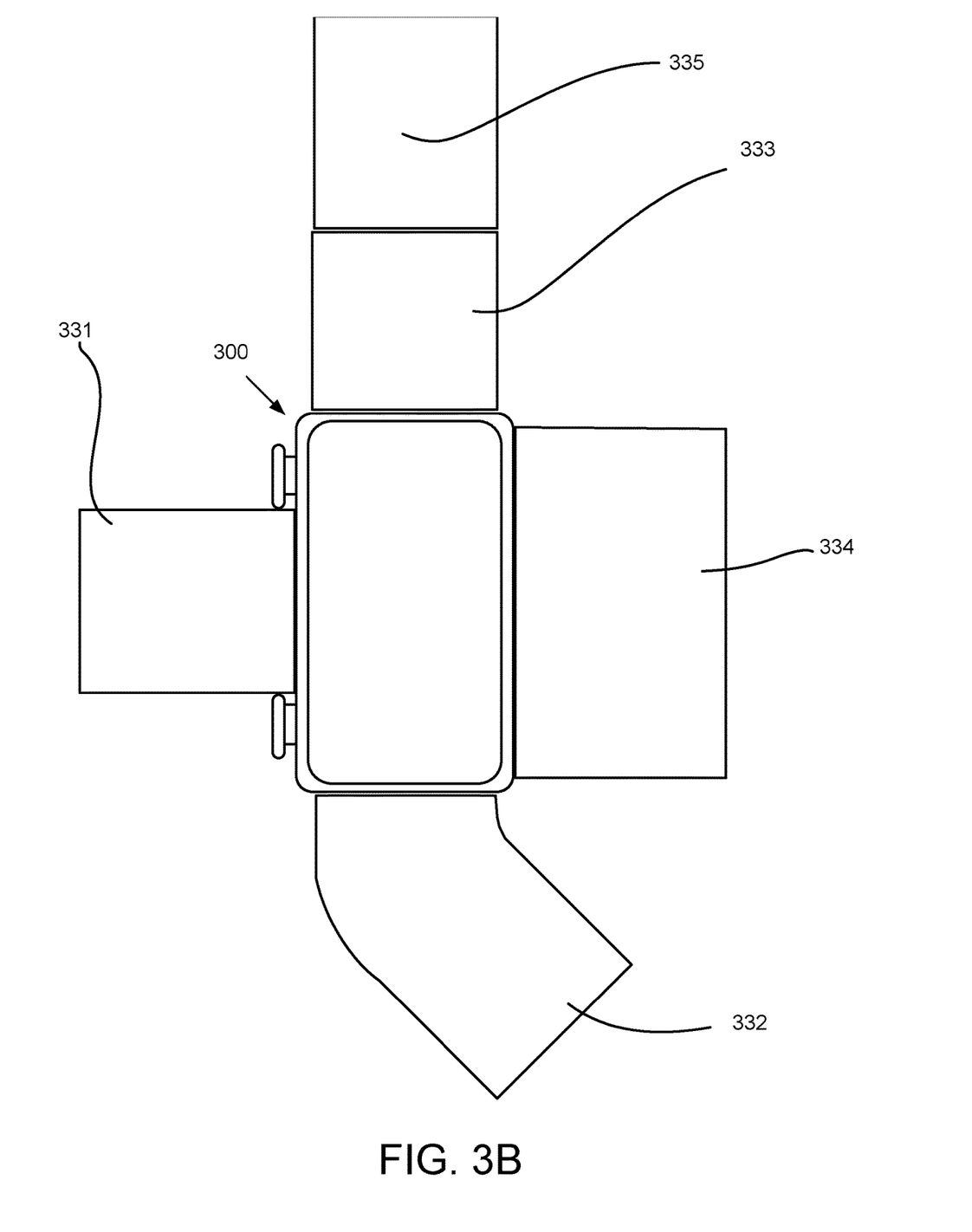
FIG. 3B is a top view of the connection apparatus depicted in FIG. 3A, according to one embodiment.

FIG. 3A is a perspective view of a connection apparatus 300 with various attachments 330, according to one embodiment. As described above, the a attachments 331, 332, 333, 334 (collectively 330) may include a variety of elements. As depicted and according to one embodiment, one of the attachments may include a member 331 that can encompass the tip of an additional support shaft, thus extending the additional support shaft in a direction perpendicular to the support shaft (not depicted) circumscribed by the connection apparatus 300. In another embodiment, an attachment may include a member 334 that is configured to engage an additional support shaft with larger dimensions than the original support shaft. Further, the attachments may include angled members 332, 333 that pitch/tilt an additional support shaft 335 in a skewed and/or non-perpendicular directions relative to the original support shaft. FIG. 3B is a top view of the connection apparatus 300 depicted in FIG. 3A, according to one embodiment. As described above, the attachments 330 may be configured to extend and angle the additional support shafts in a variety of directions, according to the specifics of a given application. The connection apparatus 300 may further include a cap 340.

In one embodiment, the female slot 324 of the attachment 333 includes an open end 325 and a closed end 326. The attachment 333 may be positioned so that the open end 325 is configured to slidably receive one of the male protrusions 322 (e.g., protruding male flanges) of the hollow connector sleeve 310. The protrusion 322 may be inserted within the female slot 324 until the protrusion 322 engages/contacts the closed end 326 of the female slot 324. In one embodiment, the connection apparatus 300 may further include fastener or securing features that facilitate maintaining a strong interlock connection between the connection apparatus 300 and the attachment 333.

Figure 4:
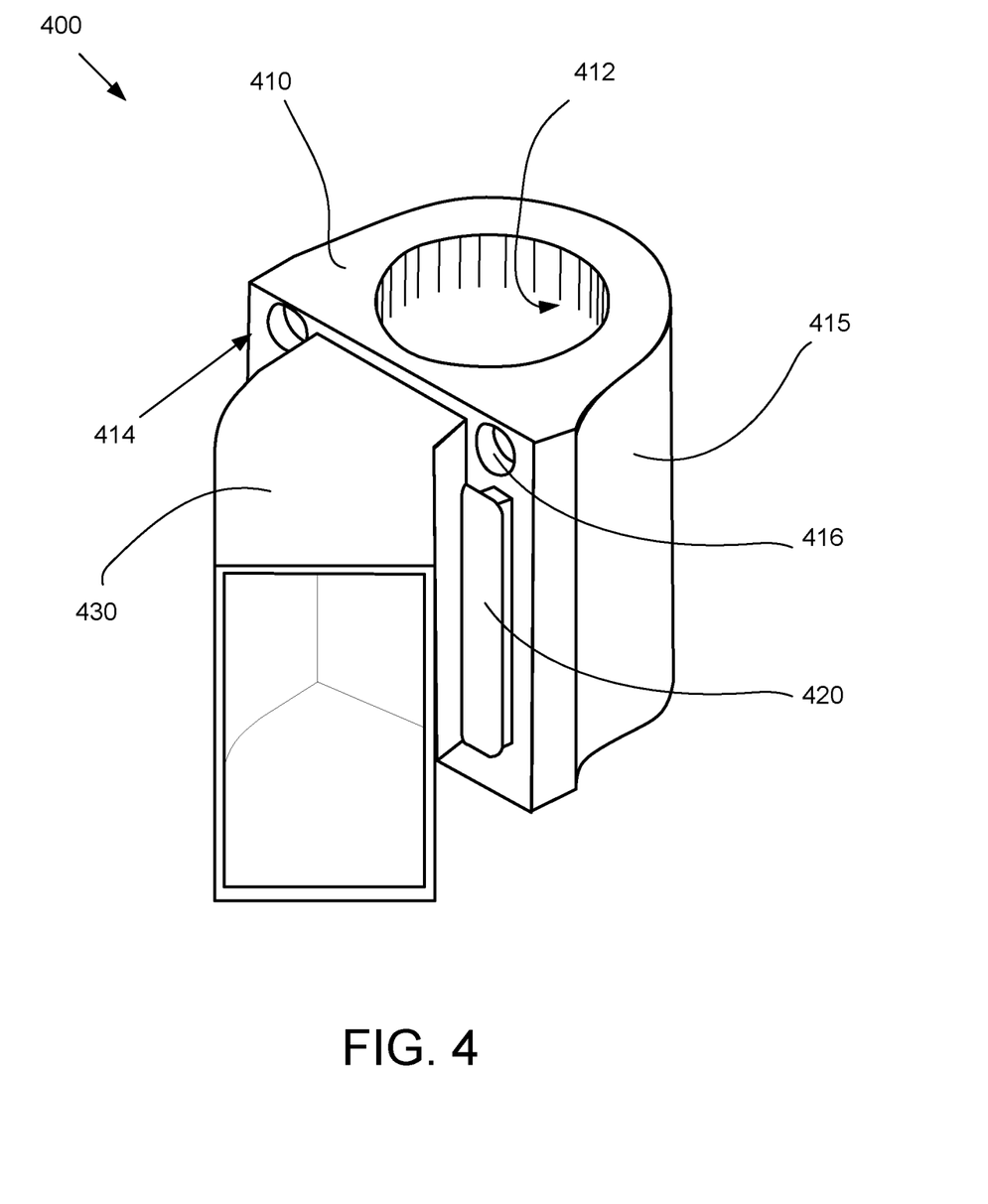
FIG. 4 is a perspective view of a cylindrical connection apparatus, according to one embodiment.

FIG. 4 is a perspective view of a cylindrical connection apparatus 400, according to one embodiment. The depicted embodiment of the connection apparatus 400 includes a hollow connector sleeve 410 that has an interior surface 412 and one exterior mounting panel 414 with the affixed interlockable components 420. The interior surface 412 has a circular cross-section for circumscribing cylindrical support shafts (not depicted). The non-attaching panel 415 is the curved exterior surface that has no panels for connecting attachments 430. Coupled to the interlockable components 420 is a curved attachment member 430 that extends an additional support shaft (not depicted) in an angled direction. The depicted connection apparatus 400 may also have an anchoring mechanism 416 for securing the apparatus 400 about the cylindrical support shaft. The anchoring mechanism may be a clamping mechanism that can be tightened to compress around the cylindrical support shaft. The depicted embodiment also shows that the exterior surfaces of the connection apparatus 400 may have a different shape than the interior surfaces 412. In other words, the apparatus may have an internal rectangular cross-section, as previously depicted in FIGS. 1A-3B, but the exterior surfaces (i.e., the exterior mounting panels 414) may have a different shape, such as a circle, rectangle, trapezoid, or others, according to the specifics of a given application.

Figure 5:
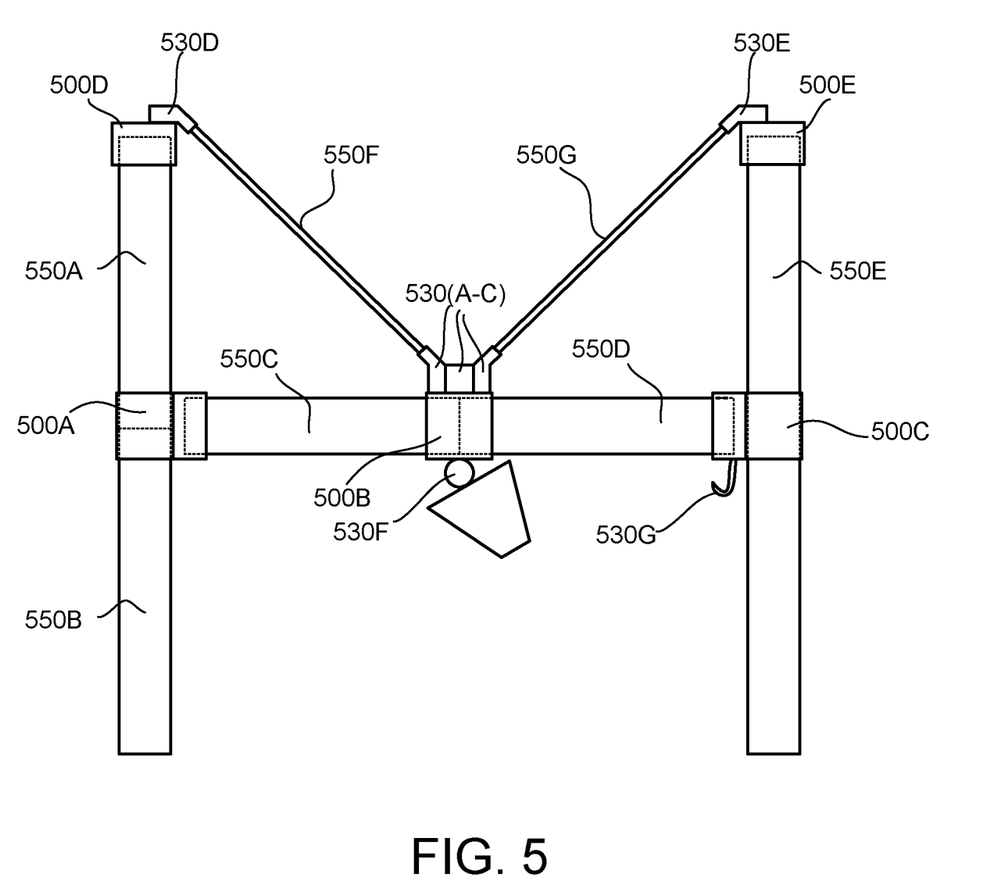
FIG. 5 is a schematic block diagram of a structure implementing various components of the present disclosure, include multiple connection apparatus', attachments, and support shafts, according to one embodiment.

FIG. 5 is a schematic block diagram of a structure system implementing various components of the present disclosure, include multiple connection apparatus' 500, attachments 530, and support shafts 550, according to one embodiment. The structure, which may be scaffolding or a tent/booth frame, represents an example of the various connections that can be made using multiple connection apparatus' 500 of the present disclosure. The first connection apparatus 500A circumscribes two abutting, vertical support shafts 550A, 550B and couples them together. This first connection apparatus 500A also includes interlocking components (not depicted) that engage an attachment that extends another support shaft 550C horizontally. This horizontal support shaft 550C is coupled with another horizontal support shaft 550D via another connection apparatus 500B. This connection apparatus 500B includes a pivoting attachment 530F (e.g., light fixture) that allows an element to swivel about the connection apparatus 500B. Further, this connection apparatus 500b also includes interlockable components (not depicted) that engage attachments 530A, 530B, 530C. Two of the attachments 530A, 530C are configured to extend support shafts 550F and 550G in angled directions. These support shafts 550F, 550G may actually be ropes, cables, or other non-rigid elements for providing additional support to the central connection apparatus 500B. On the other end of support shaft 550D is yet another connection apparatus 500C that is circumscribing a portion of another support shaft 550E. On the tops ends of support shafts 550E and 550A, two more connection apparatus' 500E, 500D are affixed. These connection apparatus' 500E, 500D include corresponding angled attachments 530D, 530E that receive the opposite end of the angled support shafts 550F, 550G. The depicted structure is illustrative of the many different configurations that are possible with the connection apparatus 500 of the present disclosure.

Figure 6:
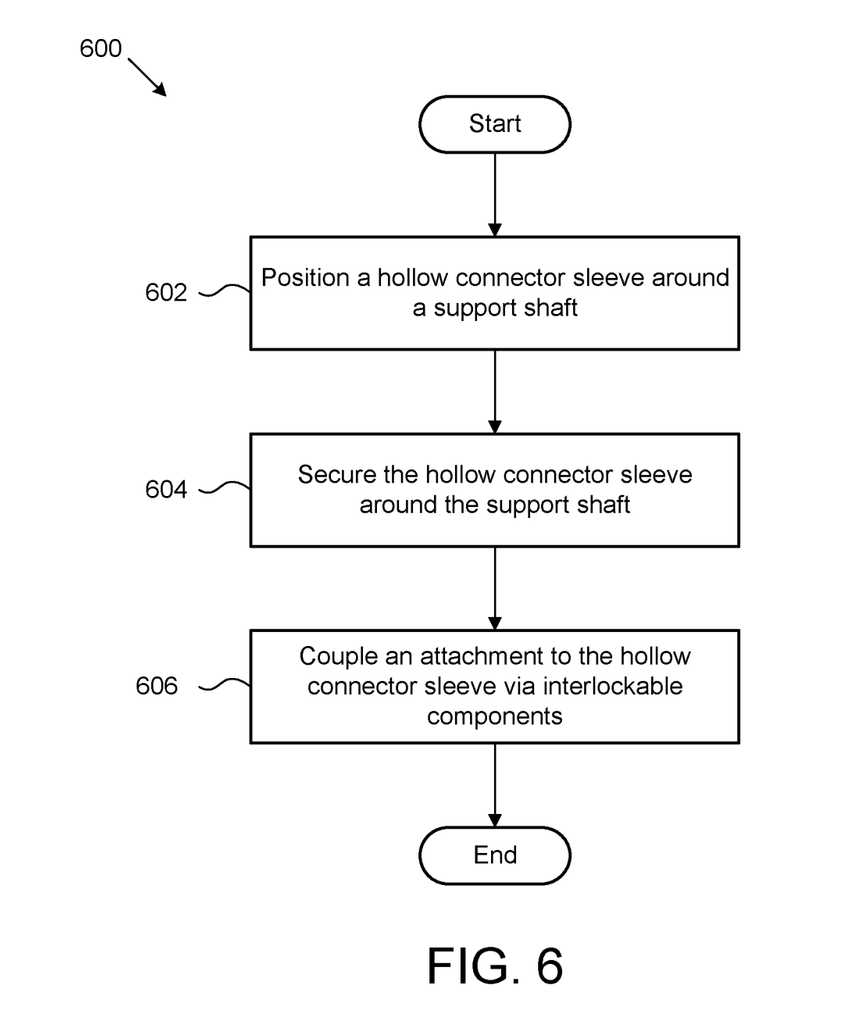
FIG. 6 is a schematic flowchart diagram of one embodiment of a method for coupling a support shaft to an attachment.

FIG. 6 is a schematic flowchart diagram of one embodiment of a method 600 for coupling a support shaft to an attachment. The method includes positioning 602 a hollow connector sleeve around a support shaft, with the hollow connector sleeve having at least one anchoring mechanism and at least one exterior mounting panel that has at least one interlockable component. The method further includes securing 604 the hollow connector sleeve around the support shaft using the anchoring mechanism and coupling 606 coupling the attachment to the hollow connector sleeve, the attachment having at least one corresponding interlockable component that is detachably couplable with the at least one interlockable component. According to one implementation, the at least one interlockable component has one of at least one male flange and at least one female slot and the at least one corresponding interlockable component comprises the other of the at least one male flange and the at least one female slot. In another implementation, coupling the attachment to the hollow connector sleeve includes sliding the at least one male flange into the at least one female slot. In one implementation, the support shaft is a first support shaft and the hollow connector sleeve is a first hollow connector sleeve, wherein the attachment is a second hollow connector sleeve positioned around a second support shaft. In yet another implementation, the support shaft is a first support shaft and positioning the hollow connector sleeve around the first support shaft further includes positioning the hollow connector sleeve around a second support shaft.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or a number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

What is claimed is:

1. An apparatus comprising:
    a hollow connector sleeve having:
        a rectangular opening comprising an interior surface configured to slide over and to conformingly receive a portion of a wooden beam that acts as a support shaft and has a cross-section selected from rectangular and square;
        one or more exterior mounting panels; and
        a plurality of interlocking components comprising male flanges, wherein each male flange has a planar rectangular block at a distal end of a rectangular connecting shaft that connects to the one or more exterior mounting panels, and wherein each male flange is configured to be slidably received into an open end of a corresponding female slot, wherein at least one male flange of the plurality of interlockable components:
  has a slot that divides the planar rectangular block and the distal end of the rectangular connecting shaft into divided portions; and
  the divided portions of the planar rectangular block are configured to pinch together to facilitate sliding the male flange into a complementary female slot and to exert pressure against edges of the female slot to enhance engagement.

2. The apparatus of claim 1, wherein the wooden beam is selected from a 2×4 and a 4×4.

3. The apparatus of claim 1, wherein the hollow connector sleeve comprises two semi-sleeves that can be affixed together around the portion of the wooden beam.

4. The apparatus of claim 1, wherein the hollow connector sleeve further comprises at least one anchoring mechanism for anchoring the hollow connector sleeve to the wooden beam.

5. The apparatus of claim 1, wherein the hollow connector sleeve is constructed of a material selected from polymer composites, plastic, wood, or metal and the plurality of interlockable components are integrated parts of the hollow connector sleeve.

6. The apparatus of claim 1, wherein the plurality of interlockable components comprises:
  three male flanges comprising one primary male flange and two secondary male flanges disposed on a first exterior mounting panel of the one or more exterior mounting panels; and
  a single primary male flange disposed on a second exterior mounting panel.

7. The apparatus of claim 6, wherein the perimeter of the primary male flange is larger than the perimeter of at least one of the two secondary male flanges.

8. The apparatus of claim 1, wherein a space between two of the male flanges forms a complementary female slot configured to receive a corresponding male flange of another apparatus.

9. The apparatus of claim 1, wherein the hollow connector sleeve comprises:
  an open end configured to receive an end portion of the wooden beam; and
  a closed end configured to cover the end portion of the wooden beam.

10. The apparatus of claim 1, further comprising one or more attachments disposed on the hollow connector sleeve, wherein the one or more attachments are selected from the group consisting of: a hook, a magnetic coupling, a bolt assembly, a hinge, a rotating bearing, a pivoting bearing, a sliding bearing, an electrical conduit support, an electrical box, an electrical fixture, a hook-and-loop member, a clamp, and a strap.

11. A system comprising:
  a hollow connector sleeve having:
    a rectangular opening comprising an interior surface configured to slide over and to conformingly receive a portion of a wooden beam that acts as a support shaft and has a cross-section selected from rectangular and square;
    one or more exterior mounting panels; and
    a plurality of male flanges, wherein each male flange of the plurality of male flanges has planar rectangular block at a distal end of rectangular connecting shaft that connects to the one or more exterior mounting panels, and wherein each male flange is configured to be slidably received into an open end of a corresponding female slot; and
  a first attachment comprising at least one attaching surface having at least one female slot that is complementary to and detachably couplable to a male flange of the hollow connector sleeve; and
  a second attachment comprising at least one attaching surface having two or more female slots that are complementary to and detachably couplable to two or more male flanges of the plurality of male flanges of the hollow connector sleeve,
  wherein the first attachment and the second attachment are configured to detachably couple to the same exterior mounting panel of the hollow connector sleeve.

12. The system of claim 11, wherein the at least one female slot comprises:
  an open end configured to slidably receive an inserted end of the male flange; and
  a closed end to contact the inserted end of the male flange in a fully inserted position.

13. The system of claim 11, wherein at least one male flange of the plurality of interlockable components:
  has a slot that divides the planar rectangular block and the distal end of the rectangular connecting shaft into divided portions; and
  the divided portions of the planar rectangular block are configured to pinch together to facilitate sliding the male flange into a complementary female slot and to exert pressure against edges of the female slot to enhance engagement.

14. The system of claim 11, wherein the first attachment has a proximal portion with an interlockable component selected from a female slot and a male flange that detachably couples to a complementary interlockable component selected from a male flange and a female slot of the hollow connector sleeve and a distal portion with an opening configured to engage an additional support shaft.

15. The system of claim 14, wherein the additional support shaft has a larger cross-section than the wooden beam.

16. The system of claim 14, wherein first attachment comprises an angled member configured to couple the additional support shaft to the wooden beam at an angle relative to the length of the wooden beam.

17. A method comprising:
  providing a hollow connector sleeve having:
    a rectangular opening comprising an interior surface configured to slide over and to conformingly receive a portion of a wooden beam that acts as a support shaft and has a cross-section selected from rectangular and square;
    one or more exterior mounting panels; and
    a plurality of male flanges, wherein each male flange of the plurality of male flanges has planar rectangular block at a distal end of rectangular connecting shaft that connects to the one or more exterior mounting panels, and wherein each male flange is configured to be slidably received into an open end of a corresponding female slot;
  coupling an attachment comprising at least one attaching surface, the attaching surface comprising at least one female slot that is complementary to and detachably couples to a male flange of the plurality of male flanges of the hollow connector sleeve; and inserting an additional support shaft into an opening at a distal end of the attachment wherein the additional support shaft is disposed at an angle relative to the wooden beam.

18. The method of claim 17, wherein at least one male flange of the plurality of interlockable components:
- has a slot that divides the planar rectangular block and the distal end of the rectangular connecting shaft into divided portions; and
- the divided portions of the planar rectangular block are configured to pinch together to facilitate sliding the male flange into a complementary female slot and to exert pressure against edges of the female slot to enhance engagement.

* * * * *